Figure 1:
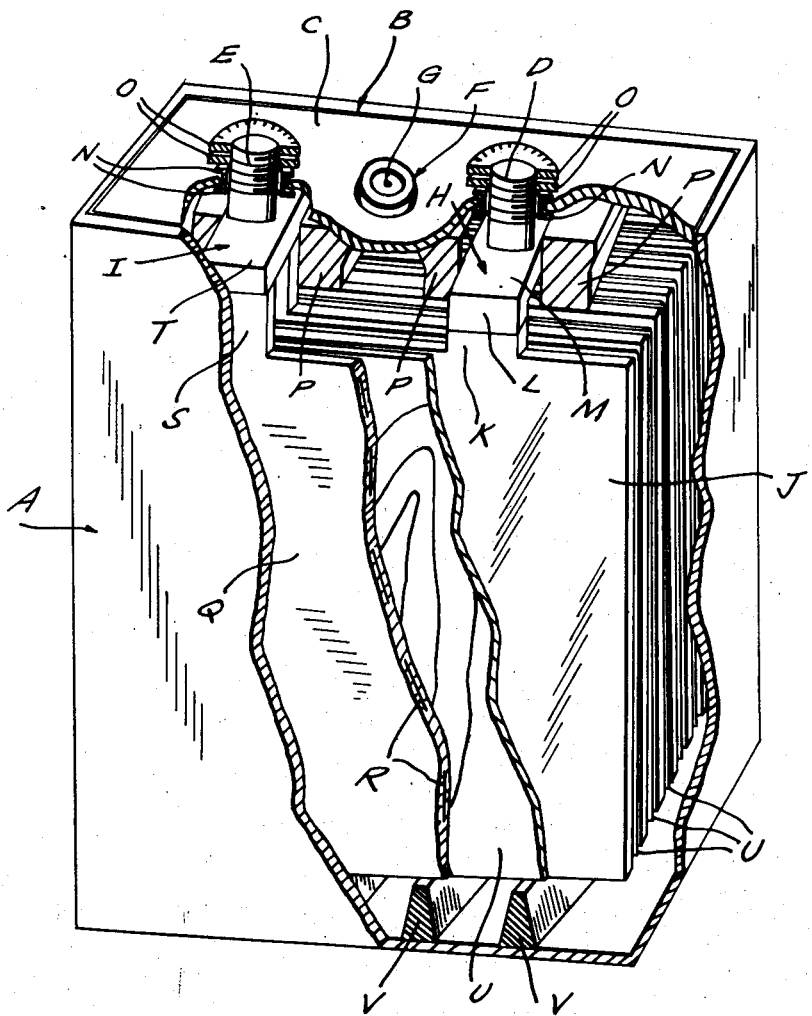

Sept. 29, 1953 M. S. GODEAS 2,653,984
ELECTRIC STORAGE BATTERY
Filed Aug. 16, 1952 2 Sheets-Sheet 1

INVENTOR.
MARCELLO SAMER GODEAS
BY

Patented Sept. 29, 1953

2,653,984

UNITED STATES PATENT OFFICE 2,653,984

ELECTRIC STORAGE BATTERY

Marcello Samer Godeas, Seville, Spain

Application August 16, 1952, Serial No. 304,807
In Spain August 16, 1951

9 Claims. (Cl. 136—22)

The present invention relates to accumulators for storing electrical energy, and more particularly to alkaline accumulators.

It is an object of the present invention to provide an accumulator of the kind described which has a high storing capacity.

It is another object of the present invention to provide an accumulator having electrodes of a novel kind.

It is a still further object of the present invention to provide an accumulator having good charging and discharging characteristics.

An accumulator according to the present invention comprises a container having an open upper end, a lid closing the upper end of the container and having an edge portion rigidly connected to the edge portion of the upper end of the container, the lid having two openings and an internally threaded aperture serving for filling the accumulator with electrolyte, two pins arranged, respectively, in the openings of the lid, the pins forming the positive and negative terminals of the accumulator, an externally threaded plug screwed into the internally threaded aperture of the lid and having at least one boring for the escape of the gases formed inside the accumulator, at least one positive electrode arranged in the container and connected to the pin forming the positive terminal of the accumulator, and at least one negative electrode arranged in the container and connected to the pin forming the negative terminal of the accumulator.

Preferably the positive electrode includes a pressed plate consisting of a mixture of finely divided carbonaceous material and manganese dioxide and asbestos threads connected to one another and pressed into the plate so as to form a compact body having a high mechanical rigidity and porosity, the asbestos threads being preferably arranged partly in the interior of the plate and partly at the outer faces of the plate.

In a preferred embodiment of the present invention the negative electrode consists of an iron plate having grooves forming a grid with one another, and filaments consisting of iron material are pressed into the grooves, the filaments forming a uniform surface of the iron plate.

In a preferred embodiment of the present invention a plurality of electrode-supporting bars is arranged at the bottom of the container, the bars consisting of insulating material and being separated by spaces for the collection of particles falling off from the electrodes.

Figure 2:
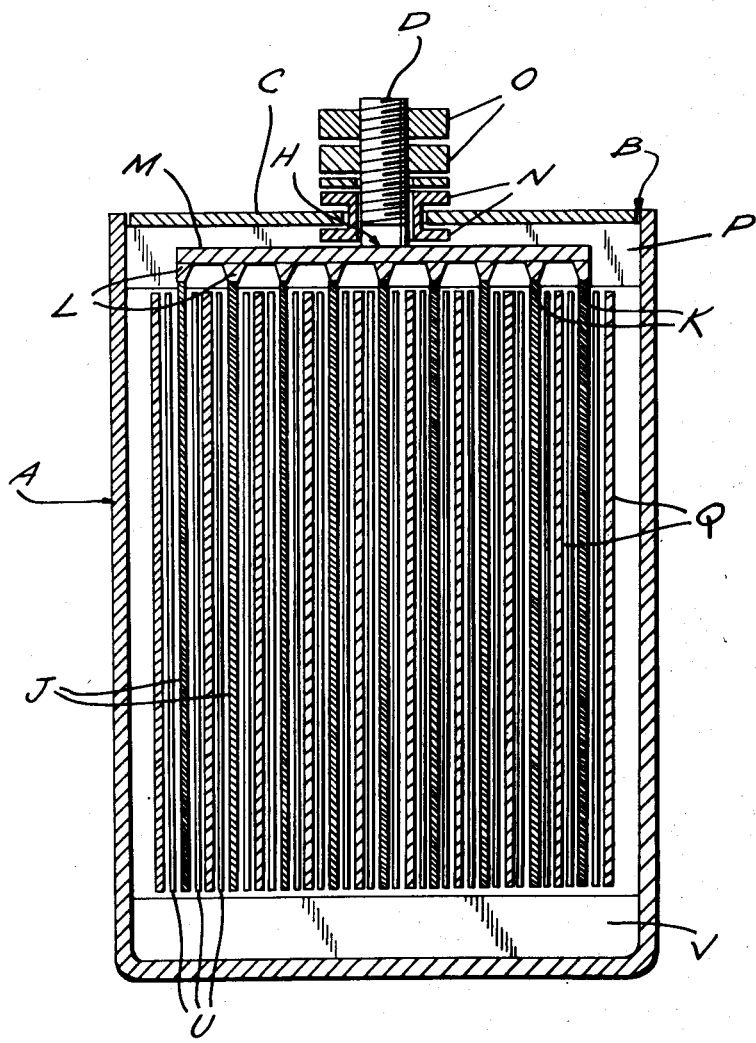

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Fig. 1 is a perspective view of an accumulator according to the invention partly broken away in order to show the internal elements of the accumulator; and Fig. 2 is a cross-section through one of the terminals of the accumulator shown in Fig. 1.

Referring now to the drawings, the accumulator comprises a container A, preferably of parallelepipedic shape. However, the container A could have a cylindrical shape and the width and height thereof could have any value. The container A has an open upper end B. The container consists either of electrical insulating material or any metal preferably of iron or steel. The open upper end B of the container A is closed by a lid C having an edge portion rigidly connected to the edge portion of the upper end B of the container A preferably by means of pitch, tar or any other insulating material if the lid and the container consists of insulating material. However, if the container A and the lid C consist of metal the same could be welded or soldered to each other so as to provide a closure impermeable for the electrolyte. The lid is provided with two openings for the accommodation of two pins D and E forming, respectively, the positive and negative terminals of the accumulator. Furthermore, the lid C is provided with an internally threaded aperture F serving for filling the accumulator with electrolyte and accommodating an externally threaded plug G screwed into the internally threaded aperture F of the lid C and having at least one boring extending in the longitudinal direction of the plug G for the escape of gases formed inside the accumulator. The plug G consists of insulating material or metal.

Inside the container A are arranged the anode H and the cathode I. The anode H is connected to a pin D forming the positive terminal of the accumulator and to a plurality of positive square or rectangular electrode plates J which have a thickness of 1.5, 2, 2.5, 3 or more mm. and consist according to the present invention of pressed bodies consisting of retort carbon, coke, graphite, shining soot or any other suitable kind of carbonaceous material. The material selected for the formation of this electroplate is finely ground and mixed with a suitable proportion of manganese dioxide, $MnO_2$ and the whole is subsequently mixed with tar, compressed and eventually carbonized and heated in order to improve the electrical conductivity thereof.

For instance, the following compositions have been found to be suitable: 50% retort carbon, 20% shining soot, 20% manganese dioxide, 10% tar; or 50% coke, 20% shining soot, 25% manganese dioxide, 5% tar; or 20% graphite, 50% retort carbon, 25% manganese dioxide, 5% tar, the percentages being volume percentages.

The content of manganese dioxide can amount to 20%–50% of the volume, the optimum being 25%. The tar may amount to 5%–25% of the total volume, the optimum being 10%. Instead of the tar either glucose or sugar can be used in amounts of 20%–40%, the optimum being 30%. Both glucose and sugar are applied as a highly viscous aqueous mixture or solution.

In the interior of these plates and on the outer faces thereof may be arranged uniformly distributed and interwoven fibers, threads or cords of asbestos in order to obtain a compact body of fine mechanical rigidity and porosity. The volume percentages of the fibers, threads or cords of asbestos should be 5%–15%, the optimum being 10%.

Each of the plates is provided at the upper end thereof with an extension K consisting of electroconductive and very compact carbon having as little porosity as possible. On this extension K a cap, sleeve or hood L is arranged by pressing. The cap L consists of metal and is soldered or welded to a metal rod or bar M so as to fix the several caps and plates at exact predetermined distances from one another. The pin D is connected to the rod or bar M by soldering, the pin D extending through the lid C of the accumulator and being preferably insulated against the lid by discs or rings or similar shims N surrounding the same if the lid C consists of metal. The pin D carries in its upper half a thread engaged by corresponding nuts O serving for connecting the pin D to a suitable connecting terminal (not shown). The caps or hoods L, the connecting bar M and the lower part of the pin D are preferably protected by insulating and impermeable layers P so that they are not damaged inside the container A by an oxidation. The layer P consists of pitch, bitumen, tar, asphalt or the like which is applied in heated condition in a mold. The impermeable and insulating protective layer P extends to the lid C and firmly adheres to the inner side thereof.

The cathode I consists also of a plurality of square or rectangular plates Q the thickness and dimensions of which are equal to those of the positive plates. The plates Q have each a core R consisting of sheet iron or steel and having a thickness of 0.5, 1, 1.5, 2 or more mm. The core is grooved in a form of a grid so as to have waveshaped indentations into which strands of fine threads of iron or steel wool or shavings are firmly pressed so that the plates Q give the impression of homogeneous porous iron plates having uniform thickness, and surfaces and sharp edged contours. The plates Q are provided at the upper side thereof with extensions S forming continuations of the cores R and thus consisting of iron or steel. The extensions S are welded or soldered to a metal rod or bar T which secures a fixed position at equal distances of the plates Q and the extensions S. The bar T is welded to the pin E extending through the opening of the lid C and protected by means of suitable discs or rings N or the like consisting of rubber or other insulating material if the lid C consists of metal. The upper part of the pin E extending beyond the lid C is threaded and forms the negative terminal of the accumulator which can be provided with screw nuts O in order to establish the desired connection. The metallic extensions S, the metallic connecting bar T and the negative terminal E are preferably protected by an insulated and impermeable layer P so that these elements are not damaged by oxidation inside the container A. The layer P consists of pitch, tar, bitumen, asphalt or other suitable material and is applied under heat in a suitable mold and has such a thickness that it extends to the lid C firmly adhering to the inner side thereof. The electroplates are arranged inside the container in such a manner that a positive plate is disposed between two negative plates and vice versa. If the container consists of metal, insulating strips (not shown) are inserted between the edges of the plates and the walls of the container in order to avoid a damaging and disturbing contact. The electrode plates are arranged at a distance from one another of 0.5—1—1.5—2 or more mm. between the individual plates that is between a positive and a negative plate or vice versa. Distance plates U are provided which consist of wood or any other insulating and porous material and have at least the same dimensions as the electroplates and should be better a little larger than the latter.

The container A is filled with an electrolyte so that the latter covers the upper edge of the plates; the electrolyte consists of a solution of potassium carbonate $K_2CO_3$ in distilled water having a specific gravity of 1.20–1.30. Instead of the potassium carbonate solution, a solution of potassium ferrate $K_2FeO_4$ in distilled water could be used having a specific gravity of 1.20–1.40. Between the bottom of the container A and the lower edge of the plates J and Q a sufficient space is left free so that carbon and iron particles separating from the electrodes during the chemical process are deposited as a sedimentation without the lower edges of the electrode plates being contacted by the deposited particles which would lead to an internal short circuit. The electric plates are resting with the lower edges thereof on blocks or strips V consisting of insulating material and resting on the bottom of the container A so that a uniform and constant distance between the bottom of the container A and the edges of the plates J and Q is obtained.

The operation of the accumulator is as follows:

If the accumulator is new and is to be charged the pins D and E forming, respectively, the positive and negative terminals are connected, respectively, with the positive and negative terminals of a direct current generator (not shown), the terminal voltage of which amounts to 3 volts. Part of the energy of the charging current sent from the generator into the accumulator is converted into heat by the resistance opposed by the electrolyte to the migration of the ions, thus heating the electrolyte. Another portion of the energy of the charging current is absorbed by the hydrogen and oxygen atoms freed at the positive and negative electrodes and reaching their highest energy level corresponding to the status nascendi which is higher than the energy level of the molecular or gaseous state. This atomic state of the hydrogen and oxygen and the high energy level thereof are extremely unstable owing to the unescapable law of nature that all bodies and systems of bodies, whether chemical elements, compounds or mixtures, are compelled to drop to their lowest energy level being compatible with the reactions and the external influences. Thus, at the moment of the setting free of these hydrogen and oxygen atoms at the outer faces of the electrodes, the latter combine with themselves and form molecular gaseous hydrogen and oxygen $H_2$ and $O_2$, respectively, which become detached and at the same instant deliver the energies absorbed by them previously in form of negative and positive electricity which is given up to the electrodes and collects therein so that the carbon anode is rendered electrically positive and the iron cathode electrically negative. This electrification represents the counter-electromotive or polarizing force of the new accumulator which has been described hereinbefore.

While the mentioned polarization is happening at the outer faces of the electrodes, the other hydrogen and oxygen atoms are accumulated which are freed at the interior of the plates in the pores, channels and capillaries thereof provided according to the present invention. The novel construction of the two electrodes forming the subject matter of the present invention increases extremely the occluding capacity thereof. It should be noted that the mentioned storage and accumulation of the hydrogen and oxygen atoms in the positive electrodes is aided by the content thereof of manganese dioxide, since the latter easily takes up and gives off the nascent oxygen. Thus, hydrogen and oxygen remain in their atomic or nascent state owing to the occluding capacity of the electrodes and the subsequent chemical and electrochemical reactions which prevent their combinations as well as the formation of gaseous molecules of hydrogen $H_2$ and oxygen $O_2$. The storage and accumulation of hydrogen and oxygen inside the electrode plates represents the energy storing capacity of the novel accumulator forming the subject matter of the present invention. The storing capacity thereof measured in ampere hours is the larger the closer the meshes are of the network of pores, channels and capillaries of the positive and negative plates forming the electrodes, the more plates are provided, and the larger the surface area of each of the plates is.

The polarization and thus the counterelectromotive force is small at the beginning of the charging process and can be taken as 1.2 volts. The hydrogen and oxygen atoms enter during this phase into almost no reaction in the electrodes and thus absorb a lesser energy for the freeing of the same. However, during continued charging the polarization increases and reaches gradually 1.8, 2, 2.2, and 2.4 volts, the accumulator being practically charged at the latter value. During further charging the voltage increases to 2.7 and 2.8 volts which is to be ascribed to the larger resistance and the reactions encountered by the hydrogen and oxygen atoms and which drive the latter to the highest energy level until eventually an equilibrium condition is reached in which the accumulator does not store any more energy and all ions are developed as molecular and gaseous hydrogen and oxygen $H_2$ and $O_2$. From what has been said hitherto, it follows that the polarizing voltage cannot exceed the uppermost limit of 2.8 volts.

As soon as the current supply to the accumulator is interrupted, the terminal voltage thereof drops at once to 2.4 volts in an open circuit and to 2 volts if the terminals are short circuited by resistors, the voltage decreasing by steps and slowly during the useful discharge to 1.8, 1.7, 1.4, and 1.2 volts, the discharge being practically finished at the latter value. However, the discharge can be continued until the terminal voltage drops to 1, 0.5, and 0 volts, whereby an additional quantity of electricity is obtained without damaging in any respect the accumulator forming the subject matter of the present invention. Such a total exploitation of the accumulator has no influence on subsequent chargings or the life of the plates and the accumulator which can be stored for weeks or months in uncharged condition without incurring any damage. During the discharge into an external circuit the electrical charges forming the electromotive force of the polarization or the voltage are continually transferred by this current from one electrode to the other where they are neutralized and continually replaced by other charges which come from that electrical energy which has been formed with the hydrogen and oxygen atoms according to what has been said heretofore and stored in the electrodes. After the neutralization of the mentioned polarizing charges the hydrogen and oxygen atoms are freed, combine with themselves, and form hydrogen or oxygen molecules or combine with the free hydrogen and oxygen atoms developing as a secondary product of the electrolysis at the electrodes by the potassium carbonate solution and produced by the flow of the discharging current through the electrolyte in a direction opposed to the direction of the external current, thus causing the formation of water and the subsequent dilution of the electrolyte during the discharge.

If the accumulator forming the subject matter of the present invention is once charged but left with the terminals thereof unconnected, the voltage thereof and its electromotive polarizing force are insufficient for preventing any secondary electrochemical activity between the occluded gases, the electrolyte, and the electrodes. Thus a discharge occurs lasting one or several days according to the ampere hours of the capacity, the stored energy being transformed into heat by the resistances occurred by the mentioned secondary currents. However, the just mentioned drawback can be easily avoided by leaving the accumulator loaded with a few milliamps by means of a suitable resistor, once the accumulator is normally charged. By this expedient, a charge corresponding to the total capacity of the accumulator can remain stored in the same until the use thereof without much expenditure worth mentioning.

The maintenance of the accumulator forming the subject matter of the present invention is simple. Only distilled water has to be periodically added to the electrolyte in order to compensate the losses caused by evaporation. A change of electrolyte is necessary after operating the accumulator for a period of about 6 months.

The novel accumulator can be used singly or in batteries comprising 2, 3, 4, 5, 6, or more in series connected accumulators, if the voltage is to be increased or a plurality of parallel connected accumulators may be provided if the capacity of the battery is to be increased. The accumulator can be manufactured in any size and consists of any suitable material. The accumulator supplies direct current which serves for feeding electrical apparatuses and supplies the current required for immobile and mobile electrical installations and industries.

It will be understood that each of the elements described above, or two or more together, may also find a useful application in other types of accumulators differing from the types described above.

While the invention has been illustrated and described as embodied in an alkaline accumulator, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. An accumulator for storing electrical energy, comprising, in combination, a container having an open upper end; a lid closing said upper end of said container and having an edge portion rigidly connected to the edge portion of said upper end of said container, said lid having two openings and an internally threaded aperture serving for filling the accumulator with electrolyte; two pins arranged, respectively, in said openings of said lid, said pins forming the positive and negative terminals of the accumulator; an externally threaded plug screwed into said internally threaded aperture of said lid and having at least one boring for the escape of the gases formed inside the accumulator; at least one positive electrode arranged in said container and connected to said pin forming the positive terminal of the accumulator, said positive electrode including a pressed plate consisting of a mixture of finely divided carbonaceous material and manganese dioxide and asbestos threads connected to one another and pressed into said plate so as to form a compact body having a high mechanical rigidity and porosity; and at least one negative electrode arranged in said container and connected to said pin forming the negative terminal of the accumulator.

2. An accumulator for storing electrical energy, comprising, in combination, a container having an open upper end; a lid closing said upper end of said container and having an edge portion rigidly connected to the edge portion of said upper end of said container, said lid having two openings and an internally threaded aperture serving for filling the accumulator with electrolyte; two pins arranged, respectively, in said openings of said lid, said pins forming the positive and negative terminals of the accumulator; an externally threaded plug screwed into said internally threaded aperture of said lid and having at least one boring for the escape of the gases formed inside the accumulator; at least one positive electrode arranged in said container and connected to said pin forming the positive terminal of the accumulator, said positive electrode including a pressed plate consisting of a mixture of finely divided carbonaceous material and manganese dioxide and asbestos threads connected to one another and pressed into said plate so as to form a compact body having a high mechanical rigidity and porosity, said asbestos threads being arranged partly in the interior of said plate and partly at the outer faces of said plate; and at least one negative electrode arranged in said container and connected to said pin forming the negative terminal of the accumulator.

3. An accumulator for storing electrical energy, comprising, in combination, a container having an open upper end; a lid closing said upper end of said container and having an edge portion rigidly connected to the edge portion of said upper end of said container, said lid having two openings and an internally threaded aperture serving for filling the accumulator with electrolyte; two pins arranged, respectively, in said openings of said lid, said pins forming the positive and negative terminals of the accumulator; an externally threaded plug screwed into said internally threaded aperture of said lid and having at least one boring for the escape of the gases formed inside the accumulator; at least one positive electrode arranged in said container and connected to said pin forming the positive terminal of the accumulator, said positive electrode including a pressed plate consisting of a mixture of finely divided carbonaceous material and manganese dioxide; at least one negative electrode arranged in said container and connected to said pin forming the negative terminal of the accumulator, said negative electrode consisting of an iron plate having grooves forming a grid with one another; and filaments consisting of iron material and pressed into said grooves, said filaments forming a uniform surface of said iron plate.

4. An accumulator for storing electrical energy, comprising, in combination, a container having an open upper end; a lid closing said upper end of said container and having an edge portion rigidly connected to the edge portion of said upper end of said container, said lid having two openings and an internally threaded aperture serving for filling the accumulator with electrolyte; two pins arranged, respectively, in said openings of said lid, said pins forming the positive and negative terminals of the accumulator; an externally threaded plug screwed into said internally threaded aperture of said lid and having at least one boring for the escape of the gases formed inside the accumulator; at least one positive electrode arranged in said container and connected to said pin forming the positive terminal of the accumulator, said positive electrode including a pressed plate consisting of a mixture of finely divided carbonaceous material and manganese dioxide and asbestos threads connected to one another and pressed into said plate so as to form a compact body having a high mechanical rigidity and porosity; at least one negative electrode arranged in said container and connected to said pin forming the negative terminal of the accumulator, said negative electrode consisting of an iron plate having grooves forming a grid with one another; and filaments consisting of iron material and pressed into said grooves, said filaments forming a uniform surface of said iron plate.

5. An accumulator for storing electrical energy, comprising, in combination, a container having an open upper end; a lid closing said upper end of said container and having an edge portion rigidly connected to the edge portion of said upper end of said container, said lid having two openings and an internally threaded aperture serving for filling the accumulator with electrolyte; two pins arranged, respectively, in said openings of said lid, said pins forming the positive and negative terminals of the accumulator; an externally threaded plug screwed into said internally threaded aperture of said lid and having at least one boring for the escape of the gases formed inside the accumulator; at least one positive electrode arranged in said container and connected to said pin forming the positive terminal of the accumulator, said positive electrode including a pressed plate consisting of a mixture of finely divided carbonaceous material and manganese dioxide and asbestos threads connected to one another and pressed into said plate so as to form a compact body having a high mechanical rigidity and porosity, said asbestos threads being arranged partly in the interior of said plate and partly at the outer faces of said plate; at least one negative electrode arranged in said container and connected to said pin forming the negative terminal of the accumulator, said negative electrode consisting of an iron plate having grooves forming a grid with one another; and filaments consisting of iron material and pressed into said grooves, said filaments forming a uniform surface of said iron plate.

6. An accumulator for storing electrical energy, comprising, in combination, a container having an open upper end; a lid closing said upper end of said container and having an edge portion rigidly connected to the edge portion of said upper end of said container, said lid having two openings and an internally threaded aperture serving for filling the accumulator with electrolyte; two pins arranged, respectively, in said openings of said lid, said pins forming the positive and negative terminals of the accumulator; an externally threaded plug screwed into said internally threaded aperture of said lid and having at least one boring for the escape of the gases formed inside the accumulator; a plurality of positive electrodes arranged in said container and having first extensions, respectively, said positive electrodes each including a pressed plate consisting of a mixture of finely divided carbonaceous material and manganese dioxide and asbestos threads connected to each other and pressed into said plates so as to form compact bodies having a high mechanical rigidity and porosity; a first metal bar connected to said first extensions and said pin forming a positive terminal of the accumulator; a plurality of negative electrodes arranged in said container oppositely to said positive electrodes and having second extensions, respectively; and a second metal bar connected to said second extensions and said pin forming a negative terminal of the accumulator.

7. An accumulator for storing electrical energy, comprising, in combination, a container having an open upper end; a lid closing said upper end of said container and having an edge portion rigidly connected to the edge portion of said upper end of said container, said lid having two openings and an internally threaded aperture serving for filling the accumulator with electrolyte; two pins arranged, respectively, in said openings of said lid, said pins forming the positive and negative terminals of the accumulator; an externally threaded plug screwed into said internally threaded aperture of said lid and having at least one boring for the escape of the gases formed inside the accumulator; a plurality of positive electrodes arranged in said container and having first extensions, respectively, said positive electrodes each including a pressed plate consisting of a mixture of finely divided carbonaceous material and manganese dioxide and asbestos threads connected to each other and pressed into said plates so as to form compact bodies having a high mechanical rigidity and porosity, said asbestos threads being arranged partly in the interior of said plates and partly at the outer faces of said plates; a first metal bar connected to said first extensions and said pin forming a positive terminal of the accumulator; a plurality of negative electrodes arranged in said container oppositely to said positive electrodes and having second extensions, respectively; and a second metal bar connected to said second extensions and said pin forming a negative terminal of the accumulator.

8. An accumulator for storing electrical energy, comprising, in combination, a container having an open upper end; a lid closing said upper end of said container and having an edge portion rigidly connected to the edge portion of said upper end of said container, said lid having two openings and an internally threaded aperture serving for filling the accumulator with electrolyte; two pins arranged, respectively, in said openings of said lid, said pins forming the positive and negative terminals of the accumulator; an externally threaded plug screwed into said internally threaded aperture of said lid and having at least one boring for the escape of the gases formed inside the accumulator; at least one positive electrode arranged in said container and connected to said pin forming the positive terminal of the accumulator, said positive electrode including a pressed plate consisting of a mixture of finely divided carbonaceous material and manganese dioxide and asbestos threads connected to one another and pressed into said plate so as to form a compact body having a high mechanical rigidity and porosity, said asbestos threads being arranged partly in the interior of said plate and partly at the outer faces of said plate; at least one negative electrode arranged in said container and connected to said pin forming the negative terminal of the accumulator, said negative electrode consisting of an iron plate having grooves forming a grid with one another; filaments consisting of iron material and pressed into said grooves, said filaments forming a uniform surface of said iron plate; and an electrolyte consisting of a solution of potassium carbonate in water having a specific gravity of 1.20–1.30 and completely covering said plates.

9. An accumulator for storing electrical energy, comprising, in combination, a container having an open upper end; a lid closing said upper end of said container and having an edge portion rigidly connected to the edge portion of said upper end of said container, said lid having two openings and an internally threaded aperture serving for filling the accumulator with electrolyte; two pins arranged, respectively, in said openings of said lid, said pins forming the positive and negative terminals of the accumulator; an externally threaded plug screwed into said internally threaded aperture of said lid and having at least one boring for the escape of the gases formed inside the accumulator; at least one positive electrode arranged in said container and connected to said pin forming the positive terminal of the accumulator, said positive electrode including a pressed plate consisting of a mixture of finely divided carbonaceous material and manganese dioxide and asbestos threads connected to one another and pressed into said plate so as to form a compact body having a high mechanical rigidity and porosity, said asbestos threads being arranged partly in the interior of said plate and partly at the outer faces of said plate; at least one negative electrode arranged in said container and connected to said pin forming the negative terminal of the accumulator, said negative electrode consisting of an iron plate having grooves forming a grid with one another; filaments consisting of iron material and pressed into said grooves, said filaments forming a uniform surface of said iron plate; an electrolyte consisting of a solution of potassium carbonate in water having a specific gravity of 1.20–1.30 and completely covering said plates; and a plurality of electrode supporting bars arranged at the bottom of said container, said bars consisting of insulating material and being separated by spaces for the collection of particles falling off from said electrodes.

MARCELLO SAMER GODEAS.

References Cited in the file of this patent

UNITED STATES PATENTS

| Number | Name | Date |
| --- | --- | --- |
| 271,880 | Maloney | Feb. 6, 1883 |
| 294,463 | Haid | Mar. 4, 1884 |
| 306,051 | Basset | Oct. 7, 1884 |
| 744,216 | Lyons et al. | Nov. 17, 1903 |
| 1,275,232 | Edison | Aug. 13, 1918 |
| 1,371,746 | Fery | Mar. 15, 1921 |
| 1,390,629 | Lyndon | Sept. 13, 1921 |
| 2,588,170 | Smith | Mar. 4, 1952 |